(12) United States Patent
Zhao et al.

(10) Patent No.: US 10,745,850 B2
(45) Date of Patent: Aug. 18, 2020

(54) LEVELING DEVICE OF HOUSEHOLD APPLIANCE AND HOUSEHOLD APPLIANCE HAVING THE SAME

(71) Applicants: QINGDAO HAIER WASHING MACHINE CO., LTD., Qingdao, Shandong (CN); QINGDAO HAIER SMART TECHNOLOGY R&D CO., LTD., Qingdao, Shandong (CN)

(72) Inventors: Zhiqiang Zhao, Shandong (CN); Sheng Xu, Shandong (CN); Huacheng Song, Shandong (CN); Peiqiang He, Shandong (CN)

(73) Assignees: QINGDAO HAIER WASHING MACHINE CO., LTD., Qingdao, Shandong (CN); QINGDAO HAIER SMART TECHNOLOGY R&D CO., LTD., Qingdao, Shandong (CN)

( * ) Notice: Subject to any disclaimer, the term of this patent is extended or adjusted under 35 U.S.C. 154(b) by 0 days.

(21) Appl. No.: 15/562,637

(22) PCT Filed: Jun. 7, 2016

(86) PCT No.: PCT/CN2016/085072
§ 371 (c)(1),
(2) Date: Sep. 28, 2017

(87) PCT Pub. No.: WO2017/177528
PCT Pub. Date: Oct. 19, 2017

(65) Prior Publication Data
US 2018/0187362 A1 Jul. 5, 2018

(30) Foreign Application Priority Data
Apr. 13, 2016 (CN) .......................... 2016 1 0229118

(51) Int. Cl.
*D06F 39/12* (2006.01)
*F16M 7/00* (2006.01)
*D06F 37/20* (2006.01)

(52) U.S. Cl.
CPC ............ *D06F 39/125* (2013.01); *D06F 37/20* (2013.01); *F16M 7/00* (2013.01)

(58) Field of Classification Search
CPC ....... A47B 91/16; D06F 39/125; D06F 39/12; F16M 7/00; F16M 2200/08
(Continued)

(56) References Cited

U.S. PATENT DOCUMENTS 2,908,472 A * 10/1959 McDonald ........... B60G 21/106
180/9.5
4,342,214 A * 8/1982 Neuendorf ............. B21D 28/04
267/137

(Continued)

FOREIGN PATENT DOCUMENTS

JP 53034052 A * 3/1978

*Primary Examiner* — Anita M King
(74) *Attorney, Agent, or Firm* — Buchanan Ingersoll & Rooney PC

(57) ABSTRACT

The bottom of a household appliance is provided with leveling feet. The leveling foot comprises a fixed part and a movable part, and a hollow chamber is formed between the fixed part and the movable part. The hollow chamber is provided with a hydraulic medium. Under the action of pressure, the hydraulic medium can be circulated in the hollow chamber inside the leveling foot and/or the hollow chamber between leveling feet to realize the expansion and contraction of the movable part, to execute automatic leveling. The leveling device of a household appliance of the present disclosure, according to the hydraulic principle, is provided with a hydraulic medium in the leveling foot. Under different pressures, the leveling foot is made to (Continued)

automatically adjust adaptively due to the fluidity of the hydraulic medium.

12 Claims, 12 Drawing Sheets

(58) Field of Classification Search
USPC .............................. 248/188.3, 649, 673, 677
See application file for complete search history.

(56) References Cited

U.S. PATENT DOCUMENTS

| | | | | |
|---|---|---|---|---|
| 4,712,780 | A * | 12/1987 | Ficht ...................... | B60G 11/26 |
| | | | | 188/298 |
| 6,009,815 | A * | 1/2000 | Hartman ................ | A47B 91/02 |
| | | | | 108/147 |
| 10,221,517 | B2 * | 3/2019 | Zhao ....................... | D06F 39/12 |
| 10,443,777 | B2 * | 10/2019 | Zhao ....................... | F16M 7/00 |
| 2006/0180720 | A1 * | 8/2006 | Coumoyer ............. | A47B 91/02 |
| | | | | 248/188.2 |
| 2008/0190696 | A1 * | 8/2008 | Pike ....................... | A47B 91/10 |
| | | | | 182/202 |
| 2010/0224742 | A1 * | 9/2010 | Sorohan ................ | A47B 91/16 |
| | | | | 248/157 |
| 2018/0195227 | A1 * | 7/2018 | Zhao ..................... | D06F 39/001 |
| 2018/0202095 | A1 * | 7/2018 | Zhao ..................... | A47B 91/16 |

* cited by examiner

LEVELING DEVICE OF HOUSEHOLD APPLIANCE AND HOUSEHOLD APPLIANCE HAVING THE SAME

FIELD OF THE INVENTION

The present disclosure relates to a field of household appliances, and specifically relates to a leveling device of a household appliance and a household appliance having the same.

BACKGROUND OF THE INVENTION

A leveling device is generally set at the bottom of a housing of a household appliance, and the household appliances can be stabilized by adjusting the leveling device when placing them. After leveling, the leveling device can support the household appliance to make it keep stable.

Taking a washing machine as an example, as shown in FIG. 1, leveling feet are generally installed in a bottom board 901 of a housing or in the bottom of the whole machine of existing washing machines. The leveling foot comprises a screw A, a nut gasket B and a rubber pad C. The nut gasket B rotates up and down on the screw A, and the screw A rotates up and down in a screw hole of the bottom board 901. The adjustment of the height of the washing machine is achieved by the length of the screw A of the leveling foot screwed into the screw hole of the bottom board 901. Leveling feet of most washing machines are rotated counterclockwise to increase the height of the washing machine, and are rotated clockwise to reduce the height. After the height of the foot is adjusted, the nut gasket B which prevents loosening is tightened to keep it firm.

The leveling foot of the washing machine mentioned above realizes the leveling of the washing machine although, but it requires users to adjust manually. If the weight of the washing machine is relatively large or the installation space is small, it is very inconvenient for users to operate. In addition, the vibration during the long working process of the washing machine also has an effect on the leveling foot, and it is easy to lead to the failure of support and to result in the washing machine being placed uneven.

For example, the existing 8 KG drum washing machine is generally weighing about 80 Kg, which is relatively heavy, and it is very inconvenient for consumers to adjust. Even if the adjustment is completed, it also cannot guarantee that the washing machine is adjusted to the best condition. When the washing machine is in washing process, especially when the rotation speed accelerates from 0 r/min to about 1400 r/min in spinning and dehydration process, a great vibration will be generated once the washing machine is unevenly or the foot of the washing machine is failed to support, thus it greatly affects the comfort of use of consumers.

In addition, the vibration caused by the uneven state of the washing machine may cause the foot screw to loosen, and makes the bottom bracket move vertically, and the instability may change the level state of the washing machine and results in a more intense vibration. This vicious cycle makes the noise of the washing machine become bigger and bigger after a long time of use, and it will also cause some damage to the washing machine itself and shorten the service life.

Therefore, the leveling of the existing washing machine is with the problems of manual adjustment needing, time-consuming and labor-consuming and the accuracy is poor.

In the view of foregoing, the present disclosure is proposed.

SUMMARY

To solve problems mentioned above, a leveling device of a household appliance is provided in the present disclosure. In particular, technical solutions as follows are adopted.

A leveling device of a household appliance, the bottom of the household appliance is provided with leveling feet. The leveling foot comprises a fixed part and a movable part, and a hollow chamber is formed between the fixed part and the movable part. The hollow chamber is provided with a hydraulic medium. Under the action of pressure, the hydraulic medium circulates in the hollow chamber inside the leveling foot and/or the hollow chamber between leveling feet to realize the expansion and contraction of the movable part, to execute automatic leveling.

Further, the household appliance comprises a housing and the bottom board of the housing is provided with at least two leveling feet. Each leveling foot is filled with hydraulic medium and gas. Under different pressures, the hydraulic medium and the gas within the leveling foot interact with each other to realize the expansion and the contraction of the movable part, to level automatically.

Further, the leveling foot comprises a foot base and a plunger mechanism, and a gas chamber and an oil chamber are isolated in the foot base. The oil chamber is provided with a hydraulic medium. The gas chamber and the oil chamber are communicated by an orifice and a valve opening. One end of the plunger mechanism is provided with a plug body which is set relatively slidably in the oil chamber and keeps the oil chamber sealed, and the other end of the plunger mechanism is provided with a supporting body.

Further, the leveling foot comprises a foot base and a plunger mechanism. The foot base is provided with a hollow chamber therein. One end of the plunger mechanism is provided with a plug body which is set relatively slidably in the hollow chamber and keeps the hollow chamber sealed to form an enclosed chamber, and the enclosed chamber is provided with a hydraulic medium. The volume of the hydraulic medium is less than the maximum volume of the enclosed chamber.

Further, the household appliance comprises a housing, at least four leveling feet are evenly provided at four corners of the bottom board of the housing or along the circumferential direction of the bottom board of the housing, and at least two of the leveling feet are communicated. Each leveling foot is filled with hydraulic medium and gas. Within the first range of pressure, the hydraulic medium and the gas within each foot interact with each other to realize the expansion and the contraction of the movable part, to level automatically. Within the second range of pressure, the hydraulic medium and the gas within the communicated leveling feet interact with each other to realize the expansion and the contraction of the movable part, to level automatically.

Further, the leveling foot comprises a foot base, a plunger mechanism and at least one high-pressure oil pipe. A gas chamber and an oil chamber are isolated in the foot base. The oil chamber is provided with a hydraulic medium. The gas chamber and the oil chamber are communicated through an orifice and a valve opening. One end of the plunger mechanism is provided with a plug body which is set relatively slidably in the oil chamber and keeps the oil chamber sealed, and the other end of the plunger mechanism is provided with a supporting body. The high-pressure oil pipe are respectively communicated with the gas chambers of two leveling feet.

Further, the leveling foot comprises a foot base, a plunger mechanism and at least one high-pressure oil pipe. The foot base is provided with a hollow chamber therein. One end of the plunger mechanism is provided with a plug body which is set relatively slidably in the hollow chamber and keeps the hollow chamber sealed to form an enclosed chamber, and the enclosed chamber is provided with hydraulic medium. The volume of the hydraulic medium is less than the maximum volume of the enclosed chamber. An orifice and a valve opening are provided respectively on the top of the enclosed chamber, and the high-pressure oil pipe is respectively communicated with the orifices and the valve openings of the two leveling feet.

Further, four leveling feet are provided and are divided into two sets of leveling foot groups being communicated with each other. Two adjacent leveling feet or two diagonally set leveling feet are respectively communicated with each other.

Further, the household appliance comprises a housing and at least four leveling feet which are communicated with each other are provided evenly in four corners of the bottom board of the housing or along the circumferential direction of the bottom board of the housing. Each leveling foot is filled with hydraulic medium and gas. Within the first range of pressure, the hydraulic medium and the gas inside the each leveling foot interact with each other to realize the expansion and the contraction of the movable part, to level automatically. Within the second range of pressure, the hydraulic medium and the gas inside the communicated leveling feet interact with each other to realize the expansion and the contraction of the movable part, to level automatically.

Further, an enclosed chamber which is filled with hydraulic medium and gas is provided inside the leveling foot. The enclosed chamber is communicated with at least one high-pressure oil pipe, and the high-pressure oil pipe of each leveling foot is respectively communicated to a communicating device to achieve the mutual communication between all the leveling feet.

A household appliance with any leveling device of a household appliance described above is provided at the same time. The household appliance at least refers to any one of washing machines, refrigerators, freezers, air conditioning indoor units, dishwashers, microwave ovens, water dispensers and roasters.

The leveling device of a household appliance of the present disclosure, according to the hydraulic principle, is provided with a hydraulic medium in the leveling foot. Under different pressures, the leveling foot is made to automatically adjust adaptively due to the fluidity of the hydraulic medium.

Therefore, the structure of the leveling device of a household appliance of the present disclosure is simple, and the cost is low. It is easy to use and has high reliability and it can remarkably reduce the vibration, reduce noise and improve the comfort of the experience of the washing machine for users.

Figure 1:
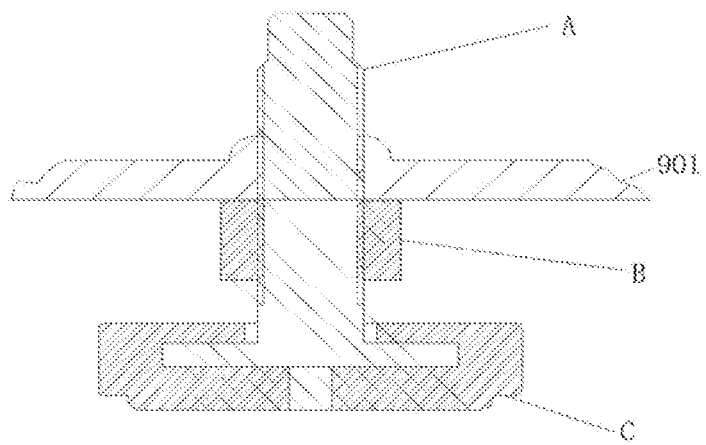
FIG. 1 is a schematic diagram of a structure of a prior leveling foot of a household appliance.

Description of labels in the drawings: 1—foot base 2—plunger mechanism 201—plug body 202—supporting body 3—oil chamber 4—gas chamber 5—orifice 6—valve opening 7—high-pressure oil pipe 701—first high-pressure oil pipe group 702—second high-pressure oil pipe group 703—third high-pressure oil pipe group 704—fourth high-pressure oil pipe group 8—hollow chamber 9—housing 901—bottom board 10—leveling foot 1001—first foot group 1002—second foot group 1003—third foot group 1004—fourth foot group 11—door window 12—detergent box 13—control panel 14—washing drum 15—communicating device 16—cylinder block 17—valve board 18—sheath 1801—inner ring boss 1802—annular recess 19—adjustable foot 1901—outer ring boss 20—screw column 21—flexible accommodating body 2101—sealing strip mechanism 22—seal ring 23—locking mechanism 24—screw hole 25—valve block 26—ground 2601—ground pit 27—fixed foot

DETAILED DESCRIPTION

The following is further and specific description of a leveling device of a household appliance and a household appliance having the same of the present disclosure with accompanying drawings.

A leveling device of a household appliance of this embodiment is provided. The bottom of the household appliance is provided with leveling foot The leveling foot comprises a fixed part and a movable part, and a hollow chamber is formed between the fixed part and the movable part. The hollow chamber is provided with a hydraulic medium. Under the action of pressure, the hydraulic medium can be circulated in the hollow chamber inside the leveling foot and/or the hollow chamber between leveling feet to realize the expansion and contraction of the movable part, to perform automatic leveling.

The leveling foot of the washing machine of the embodiment is under a certain pressure, and the hydraulic medium compresses gas, so that the adaptive expansion and contraction of the movable part is followed. When the pressure further increases, the gas is no longer compressed, the internal pressure of the gas reacts to the hydraulic medium and the movable part is with sufficient support force therewith. Therefore, the leveling foot of the washing machine of the embodiment has an adaptive automatic leveling function. The hydraulic medium of the embodiment is specifically selectable for hydraulic oil.

The leveling device of a household appliance of the embodiment, according to the hydraulic principle, is provided with a hydraulic medium in the leveling foot. Under different pressures, the leveling foot is able to automatically perform adaptive adjustment due to the fluidity of the hydraulic medium.

Therefore, the structure of the leveling device of a household appliance of the present embodiment is simple, and the cost is low. It is easy to use and has high reliability and it can remarkably reduce the vibration, reduce noise and improve the comfort of the experience of the washing machine for users.

The household appliance of the embodiment is selected from any one of a washing machine, a refrigerator, a freezer, or an indoor unit of an air conditioner.

As shown in from FIG. 6 to FIG. 13, a drum washing machine is taken as an example in the present disclosure. The drum washing machine comprises:

a washing drum 14 for holding and washing clothes;

a detergent box 12 for storing powder detergent, liquid detergent or softener;

a control panel 13 for operating the washing machine;

a door window 11 for opening to take out or put in clothes, a motor assembly for connecting at least one rotatable drive shaft to achieve at least one output;

a housing 9 for keeping an entire frame and an exterior appearance of the washing machine;

a bottom board 901 for installing the leveling device of the present disclosure.

Embodiment 1

Figure 6:
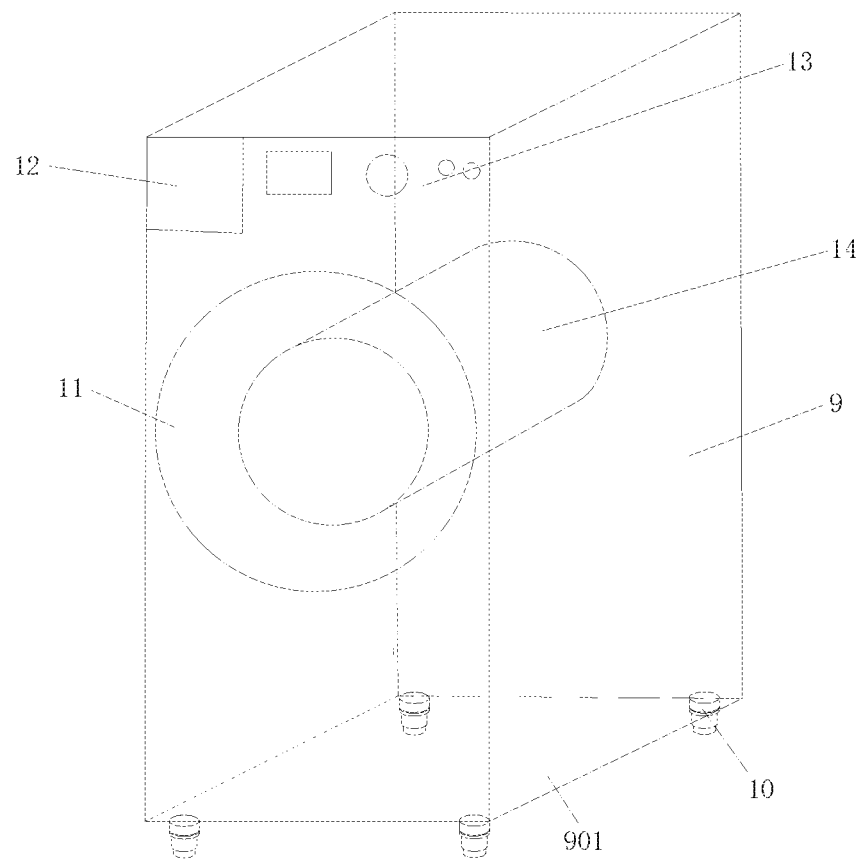
FIG. 6 is a schematic diagram of an installation of the leveling device of an embodiment of the present disclosure.

As shown in FIG. 6, the household appliance of the embodiment comprises a housing 9 and the bottom board 901 of the housing 9 is provided with at least two leveling feet 10. Each leveling foot 10 is filled with hydraulic medium and gas within. Under different pressures, the hydraulic medium and the gas within the leveling foot 10 interact with each other to realize the expansion and the contraction of the movable part, to level automatically.

The leveling feet 10 of the embodiment are provided independently. Under different pressures, the hydraulic medium and part of the gas in each leveling foot 10 flow mutually inside the hollow chamber 8 of each leveling foot 10, which to achieve different amounts of compression. So the amount of compression of the leveling foot 10 which is under bigger pressure is big, and the amount of compression of the leveling foot 10 which is under smaller pressure is small, and automatically leveling of the washing machine is realized in such manner.

At the same time, the leveling device of a household appliance of the present embodiment is also able to self-level on the partial load during a washing process and a dewatering process of the washing machine. Therefore, lower vibration and less noise is achieved.

Figure 7:
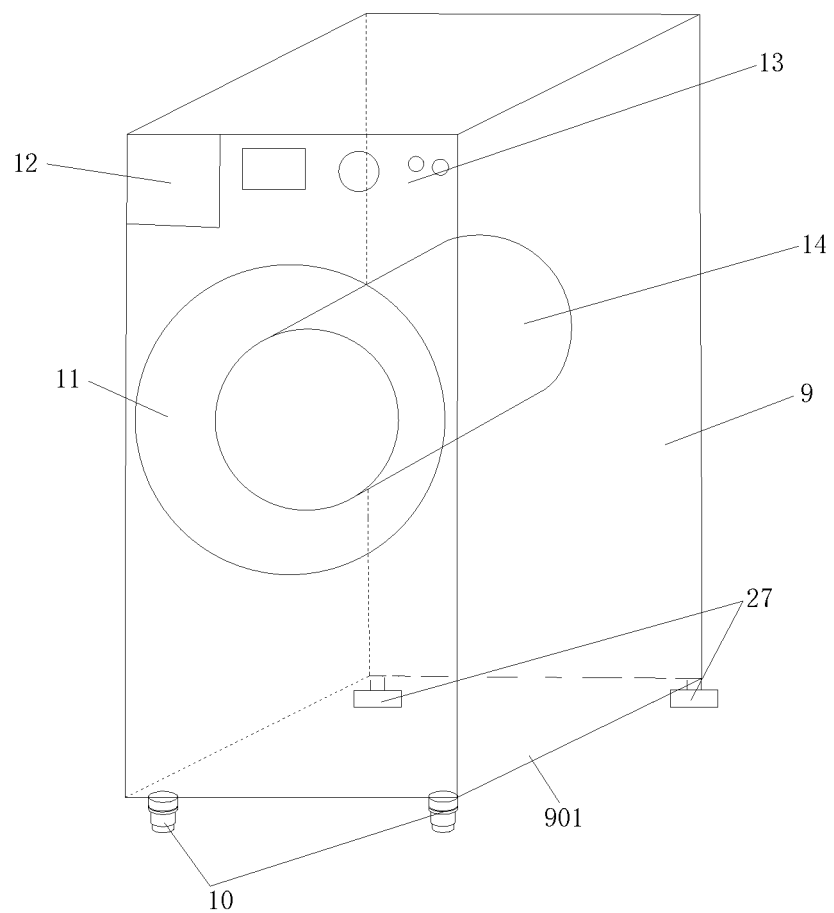
FIG. 7 is a schematic diagram of an installation of the leveling device of another embodiment of the present disclosure.

As shown in FIG. 7, four corners of the bottom board 901 of the housing 9 of the embodiment are provided with four feet, and two of them are leveling feet 10 which are filled with hydraulic medium and gas. Under different pressures, the hydraulic medium and the gas within each leveling foot 10 interact with each other to realize the expansion and the contraction of the movable part, to level automatically. The other two feet are fixed feet 27, that is, they are common feet just for supporting and the height cannot be adjusted. In this manner, the adjustment can be achieved in a certain degree and cost can be reduced by the implementation.

Figure 8:
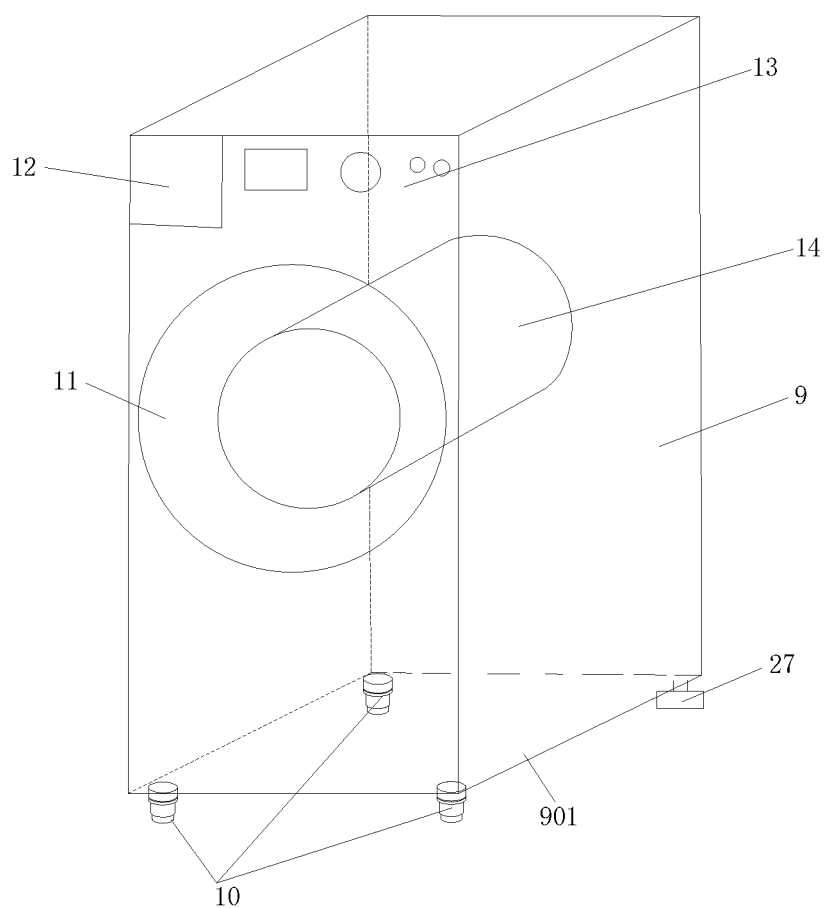
FIG. 8 is a schematic diagram of an installation of the leveling device of another embodiment of the present disclosure.

As shown in FIG. 8, four corners of the bottom board 901 of the housing 9 of the embodiment are provided with four feet, and three of them are leveling feet 10 which are filled with hydraulic medium and gas. Under different pressures, the hydraulic medium and the gas within each leveling foot 10 interact with each other to realize the expansion and the contraction of the movable part, to level automatically. The other one foot is a fixed foot 27, that is, it is a common foot just for supporting and the height cannot be adjusted. In this manner, the adjustment can be achieved in a certain degree and cost can be reduced the method of implementation.

Figure 2:
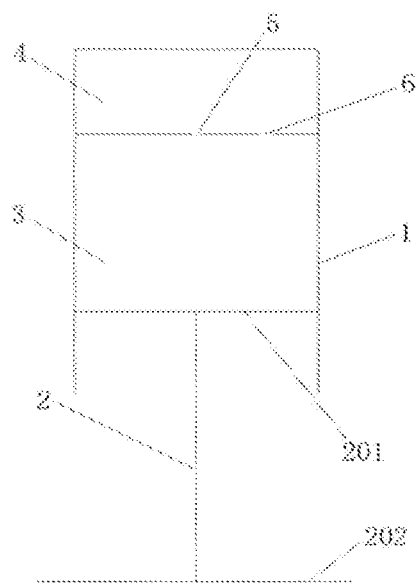
FIG. 2 is a schematic diagram of a structure of a leveling device of an embodiment of the present disclosure.

A structure of the leveling foot of the present embodiment is shown in FIG. 2, which comprises a foot base 1 and a plunger mechanism 2, and a gas chamber 4 and an oil chamber 3 are isolated in the foot base 1. The oil chamber 3 is provided with the hydraulic medium. The gas chamber 4 and the oil chamber 3 are communicated through an orifice 5 and a valve opening 6. One end of the plunger mechanism 2 is provided with a plug body which is set relatively slidably in the oil chamber 3 and keeps the oil chamber 3 sealed, and the other end of the plunger mechanism 2 is provided with a supporting body 202.

When the plunger mechanism 2 is under pressure, the hydraulic medium can flow from the oil chamber 3 to the gas chamber 4 through the orifice 5 and the valve opening 6. The greater the pressure is, the longer the length of plunger mechanism 2 being compressed into the foot base 1 is, thereby achieving automatic adjustment of height.

Figure 4:
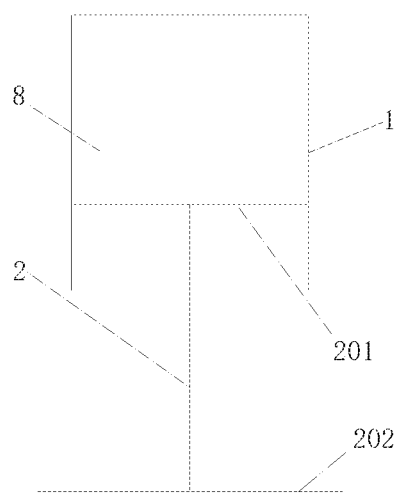
FIG. 4 is a schematic diagram of a structure of the leveling device of another embodiment of the present disclosure.
Figure 5:
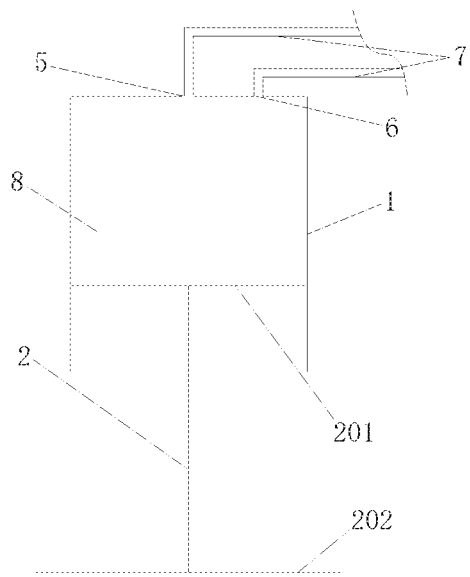
FIG. 5 is a schematic diagram of a structure of the leveling device of another embodiment of the present disclosure.

A structure of another leveling foot of the present embodiment is shown in FIG. 4. The leveling foot comprises a foot base 1 and a plunger mechanism 2. The foot base 1 is provided with a hollow chamber 8 therein. One end of the plunger mechanism 2 is provided with a plug body 201 which is set relatively slidably in the hollow chamber 8 and keeps the hollow chamber 8 sealed to form an enclosed chamber, and the enclosed chamber is provided with the hydraulic medium. The volume of the hydraulic medium is less than the maximum volume of the enclosed chamber.

The leveling foot of the present embodiment is provided with only one hollow chamber 8. Therefore, some gas is required to be filled in the hollow chamber 8 if the hydraulic medium is to be allowed to flow with the plunger mechanism 2 when the plunger mechanism 2 is under pressure. Therefore, the volume of the hydraulic medium is less than the maximum volume of the enclosed chamber.

When the plunger mechanism 2 of the present embodiment is under pressure, the hydraulic medium compresses the gas in the enclosed chamber. And the greater the pressure is, the longer the length of the plunger mechanism 2 being compressed into the foot base 1 is, thereby achieving the adjustment of height.

Embodiment 2

As shown in from FIG. 7 to FIG. 13, in the present disclosure, at least four leveling feet are evenly provided at four corners of the bottom board 901 of the housing 9 or along the circumferential direction of the bottom board 901 of the housing 9, and at least two of the leveling feet 10 are communicated with each other. Each leveling foot 10 is filled with hydraulic medium and gas. Within the first range of pressure, the hydraulic medium and the gas within each foot 10 interact with each other to realize the expansion and the contraction of the movable part, to level automatically. Within the second range of pressure, the hydraulic medium and the gas within the communicated leveling feet 10 interact with each other to realize the expansion and the contraction of the movable part, to level automatically.

In the present embodiment, the leveling feet 10 are communicated with each other so that the hydraulic medium inside the leveling foot 10 not only flow inside itself but also be able to keep flow between the leveling feet 10. When one of the leveling feet 10 is subjected to compression, the hydraulic medium flows to the other leveling foot communicated with it. The amount of the hydraulic medium in the other leveling foot increases, and the pressure increases to make the foot stretch out so as to ensure sufficient supporting force.

Figure 3:
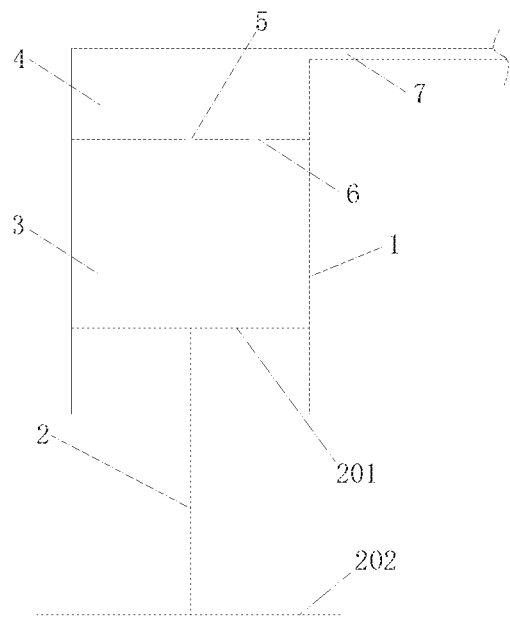
FIG. 3 is a schematic diagram of a structure of the leveling device of another embodiment of the present disclosure.

A structure of a leveling foot of the present embodiment is shown in FIG. 3, which comprises a foot base 1, a plunger mechanism 2, and at least one high-pressure oil pipe. A gas chamber 4 and an oil chamber 3 are isolated in the foot base 1. The oil chamber 3 is filled with the hydraulic medium. The gas chamber 4 and the oil chamber 3 are communicated through an orifice 5 and a valve opening 6. One end of the plunger mechanism 2 is provided with a plug body 201 which is set relatively slidably in the oil chamber 3 and keeps the oil chamber 3 sealed, and the other end of the plunger mechanism 2 is provided with a supporting body 202. The high-pressure oil pipe 7 is respectively communicated with the gas chambers 4 of two leveling feet.

A structure of a leveling foot of the present embodiment is shown in FIG. 3, which comprises a foot base 1, a plunger mechanism 2, and at least one high-pressure oil pipe 7. The foot base 1 is provided with a hollow chamber 8 therein. One end of the plunger mechanism 2 is provided with a plug body 201 which is set relatively slidably in the hollow chamber 8 and keeps the hollow chamber 8 sealed to form an enclosed chamber, and the enclosed chamber is provided with the hydraulic medium. The volume of the hydraulic medium is less than the maximum volume of the enclosed chamber. An orifice 5 and a valve opening 6 are provided respectively on the top of the enclosed chamber, and the high-pressure oil pipe 7 is respectively communicated with the orifices 5 and the valve openings 6 of the two leveling feet.

Four leveling feet are provided in the present embodiment, and are divided into two sets of leveling feet being communicated with each other. Two adjacent leveling feet or two diagonally set leveling feet are respectively communicated with each other.

Figure 9:
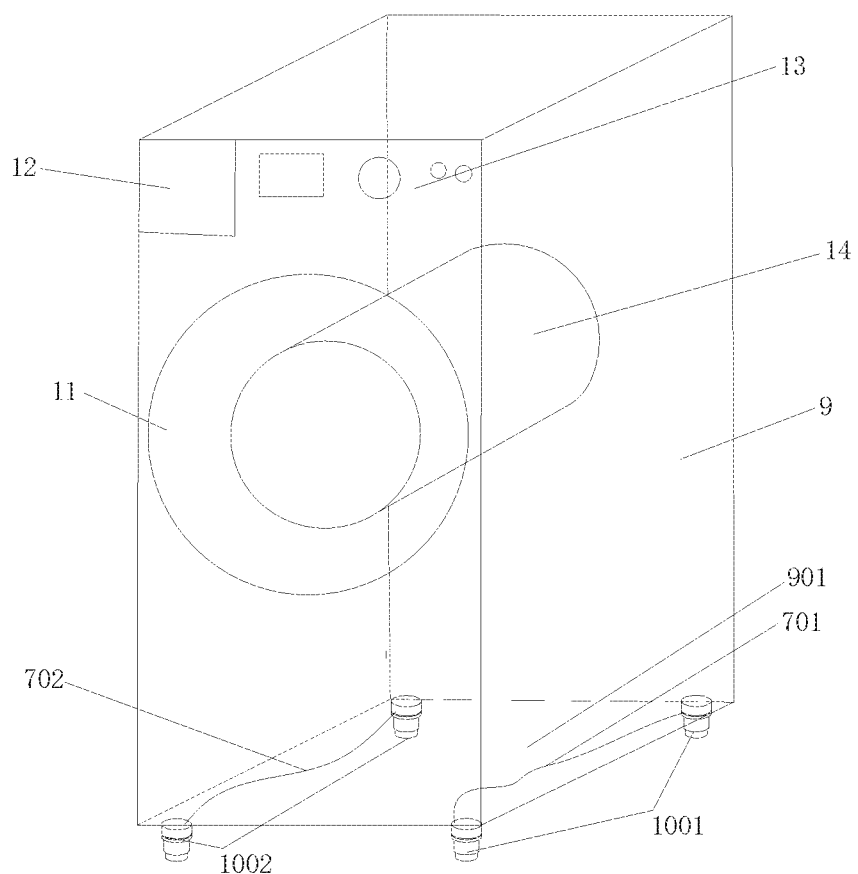
FIG. 9 is a schematic diagram of an installation of the leveling device of another embodiment of the present disclosure.

Specifically, as shown in FIG. 9, four leveling feet are fixedly arranged on the four corners of the bottom board 901 of the washing machine. A plurality of high-pressure oil pipes 7 form a first high-pressure oil pipe group 701 which is communicated with two leveling feet on the left side of the bottom board 901 of the washing machine, and the two leveling feet form a first leveling foot group 1001. A plurality of high-pressure oil pipes 7 form a second high-pressure oil pipe group 702 which is communicated with two leveling feet on the right side of the bottom board 901 of the washing machine, and the two leveling feet form a second leveling foot group 1002.

In this way, it enables the hydraulic medium and part of the gas of the first leveling foot group 1001 under different pressures to flow mutually between the two leveling feet. And it enables hydraulic medium and part of the gas of the second foot group 1002 under different pressures to flow mutually between the two leveling feet.

Figure 10:
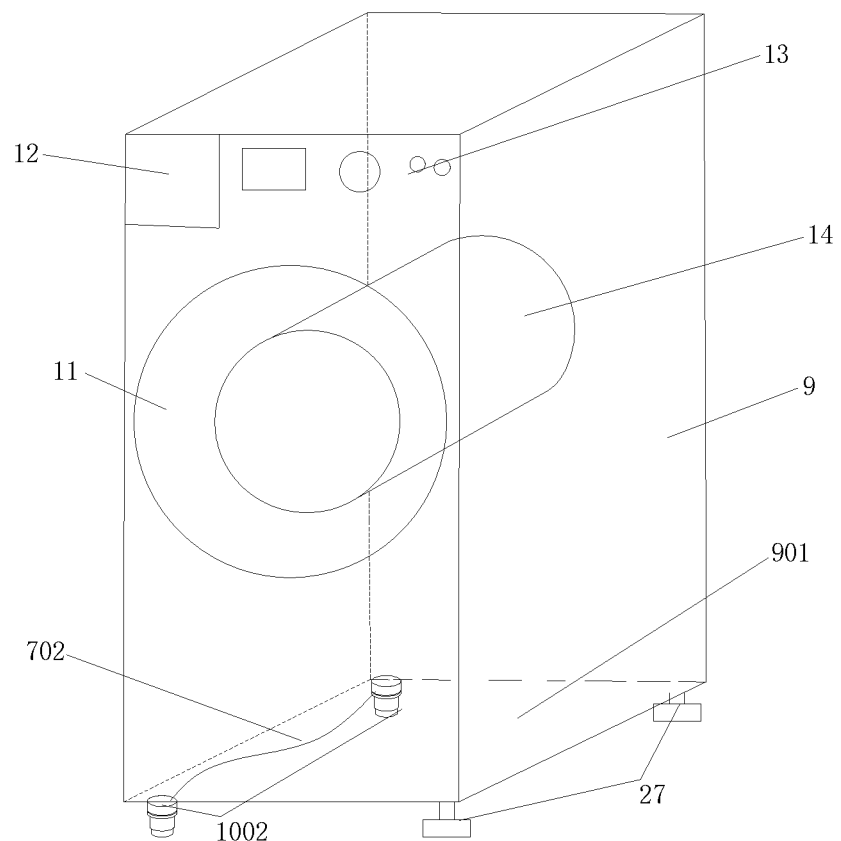
FIG. 10 is a schematic diagram of a structure of the leveling foot of a washing machine of another embodiment of the present disclosure.

As shown in FIG. 10, it is another implementation method of the present embodiment. Four corners of the bottom board 901 of the housing 9 are fixedly provided with four feet. A plurality of high-pressure oil pipes 7 form a first high-pressure oil pipe group 701 which is communicated with two leveling feet on the left side of the bottom board 901 of the washing machine, and the two leveling feet form a first leveling foot group 1001. Two feet on the right side of the bottom board 901 are fixed feet 27, that is, they are common feet which cannot automatically adjust the height and are mainly used for support. Or, a plurality of high-pressure oil pipes 7 form a second high-pressure oil pipe group 702 which is communicated with two leveling feet on the right side of the bottom board 901 of the washing machine, and the two leveling feet form a second leveling foot group 1002, and two feet on the left side of the bottom board 901 are fixed feet 27, that is, they are common feet which cannot automatically adjust the height and are mainly used for support. Adjustment can be achieved in a certain degree and cost can be reduced by the method of implementation.

Figure 11:
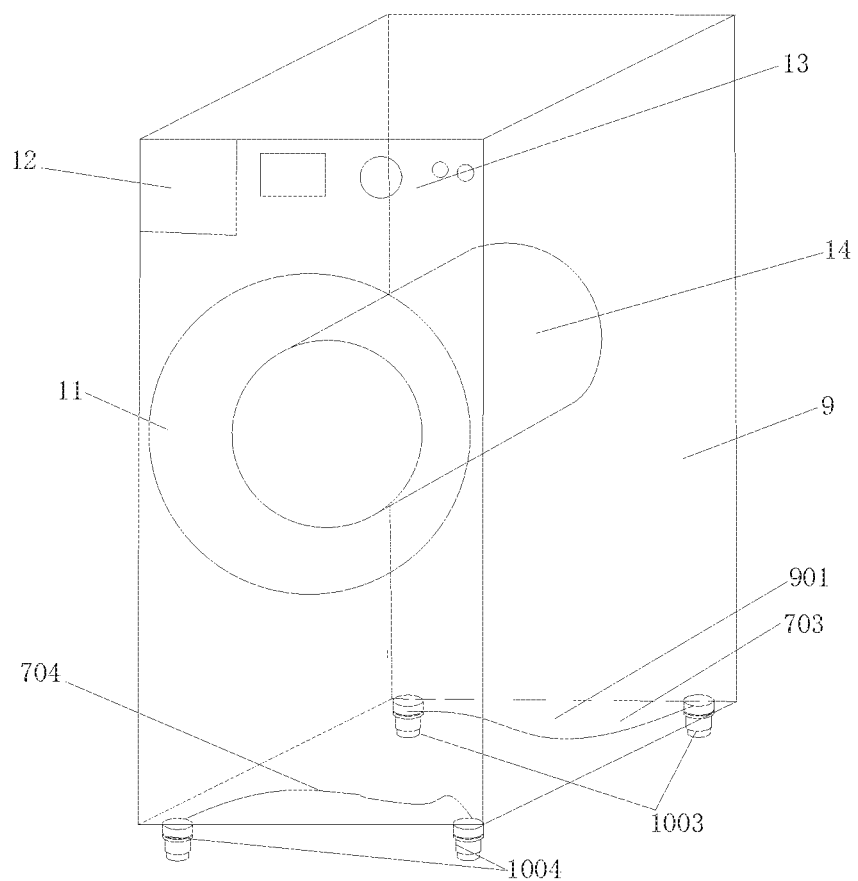
FIG. 11 is a schematic diagram of a structure of the leveling foot of a washing machine of another embodiment of the present disclosure.

As shown in FIG. 11, four corners of the bottom board 901 of the washing machine are fixedly provided with four leveling feet. A plurality of high-pressure oil pipes 7 form a third high-pressure oil pipe group 703 which is communicated with two leveling feet at the rear of the bottom board 901 of the washing machine, and the two feet form a third leveling foot group 1003. A plurality of high-pressure oil pipes 7 form a fourth high-pressure oil pipe group 704 which is communicated with two leveling feet at the front of the bottom board 901 of the washing machine, and the two feet form a fourth leveling foot group 1004.

In this way, it enables the hydraulic medium and part of the gas of the third leveling foot group 1003 under different pressures to flow mutually between the two leveling feet. And it enables the hydraulic medium and part of the gas of the fourth leveling foot group 1004 under different pressures to flow mutually between the two leveling feet.

Figure 12:
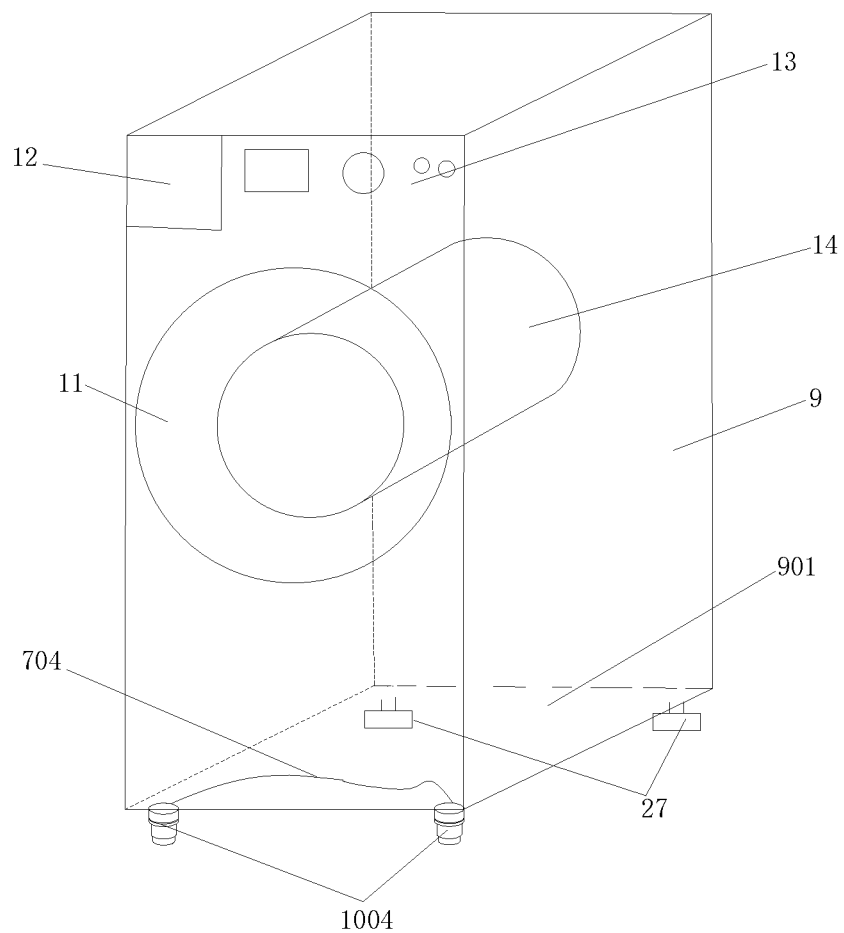
FIG. 12 is a schematic diagram of a structure of the leveling foot of a washing machine of another embodiment of the present disclosure.

As shown in FIG. 12, it is another implementation method of the present embodiment. Four corners of the bottom board 901 of the housing 9 are fixedly provided with four feet. A plurality of high-pressure oil pipes 7 form a third high-pressure oil pipe group 703 which is communicated with two leveling feet at the rear of the bottom board 901 of the washing machine, and the two leveling feet form a third leveling foot group 1003. Two leveling feet at the front of the bottom board 901 are fixed feet 27, that is, they are common feet which cannot automatically adjust the height and are mainly used for support. Or, a plurality of high-pressure oil pipes 7 form a fourth high-pressure oil pipe group 704 which is communicated with two leveling feet at the front of the bottom board 901 of the washing machine, and the two feet form a fourth leveling foot group 1004. And two leveling feet at the rear of the bottom board 901 are fixed feet 27, that is, they are common feet which cannot automatically adjust the height and are mainly used for support. Adjustment can be achieved in a certain degree and cost can be reduced by the method of implementation.

Figure 13:
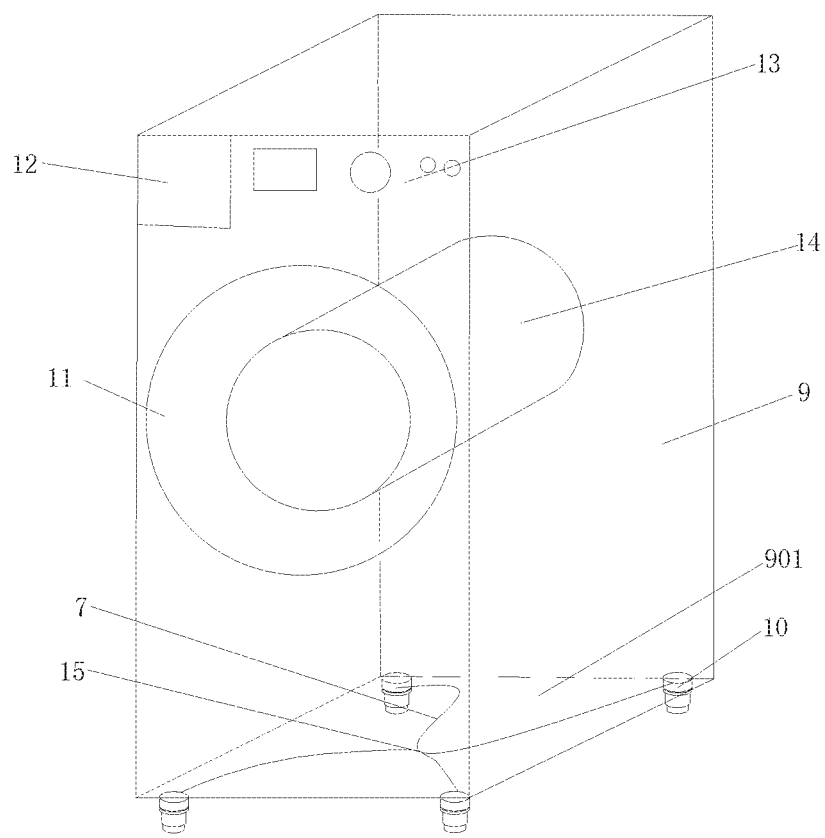
FIG. 13 is a schematic diagram of a structure of the leveling foot of a washing machine of another embodiment of the present disclosure.

As shown in FIG. 13, at least four leveling feet 10 are provided evenly in four corners of the bottom board 901 of the housing 9 or along the circumferential direction of the bottom board 901 of the housing 9. Each leveling foot 10 is filled with hydraulic medium and gas. Within the first range of pressure, the hydraulic medium and the gas inside the each leveling foot 10 interact with each other to realize the expansion and the contraction of the movable part, to level automatically. Within the second range of pressure, the hydraulic medium and the gas inside the communicated leveling feet 10 interact with each other to realize the expansion and the contraction of the movable part, to level automatically. This way realizes the communication between all the leveling feet, and the liquid medium can flow between all the leveling feet. The range of adjustment is larger, and the effect of adjustment is better.

Specifically, an enclosed chamber which is filled with hydraulic medium and gas is provided inside the leveling foot 10. The enclosed chamber is communicated with at least one high-pressure oil pipe 7, and the high-pressure oil pipe 7 of each leveling foot 7 is respectively communicated to a communicating device 15 to achieve the mutual communication between all the leveling feet 10.

Therefore, the leveling device of the present embodiment enables that the amount of compression of the leveling foot under large pressure is large and the leveling foot under small pressure extends by the action of oil pressure, and then automatically levels the washing machine. At the same time, the leveling device of a household appliance of the present embodiment is also able to self-level on the partial load during a washing process and a dewatering process of the washing machine. Therefore, lower vibration and less noise is achieved.

Embodiment 3

Figure 14:
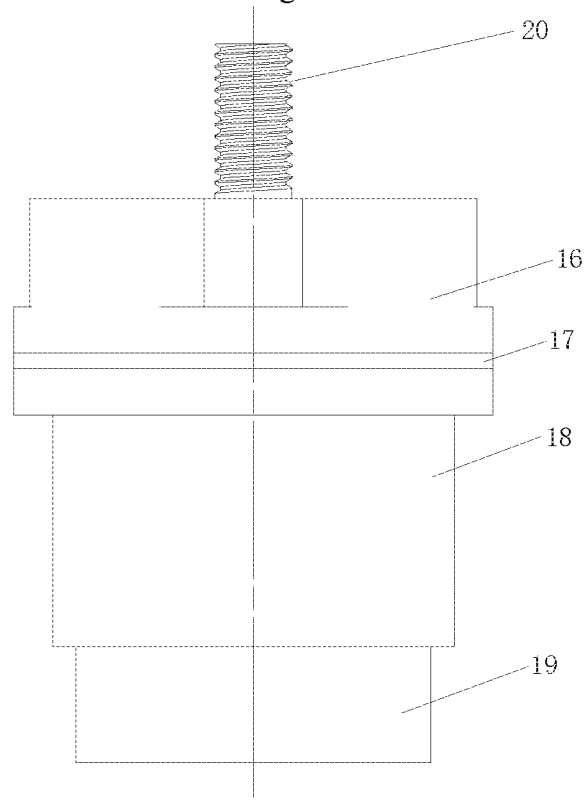
FIG. 14 is a schematic diagram of a structure of a leveling device of another embodiment of the present disclosure.
Figure 15:
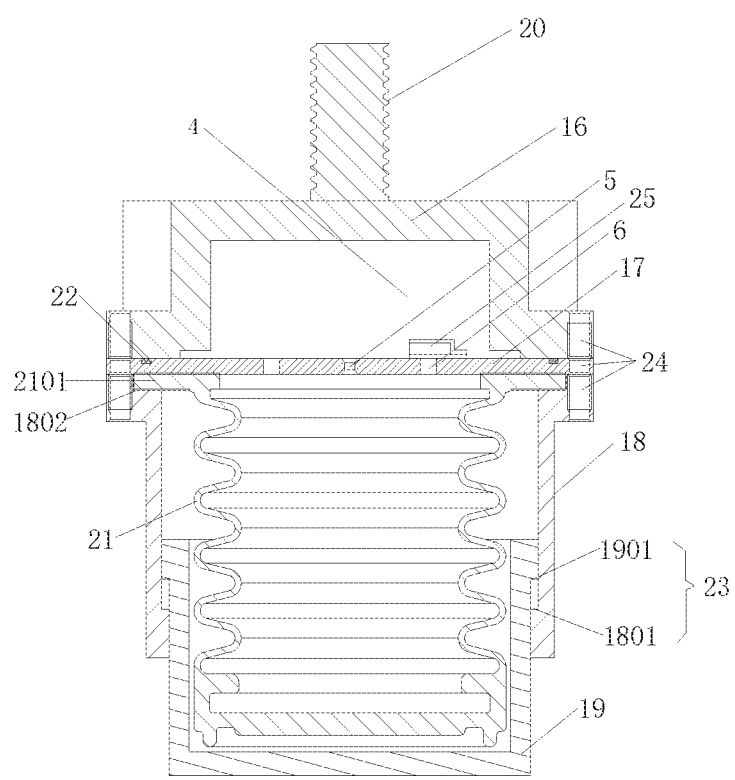
FIG. 15 is a diagram of sectional view of the leveling foot of the washing machine shown in FIG. 14 of the present disclosure.
Figure 16:
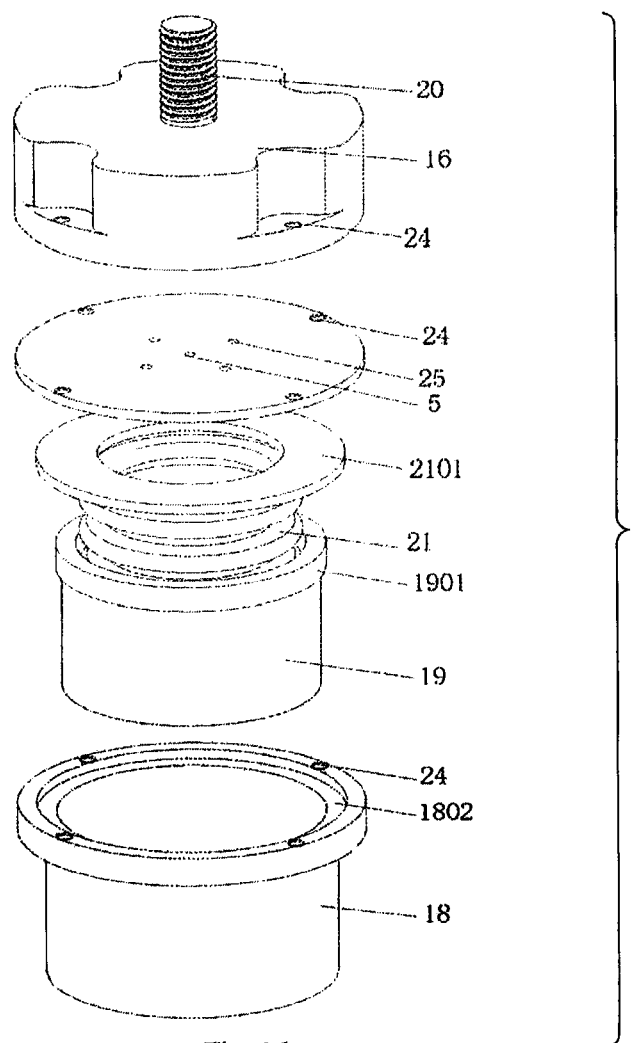
FIG. 16 is an exploded diagram of the leveling foot of the washing machine shown in FIG. 14 of the present disclosure.

As shown in FIG. 14, FIG. 15 and FIG. 16, a leveling foot of a washing machine with a function of automatic leveling of this embodiment comprises a foot base, a flexible accommodating body 21 and an adjustable foot 19. The foot base is provided with a hollow chamber and the hollow chamber at least comprises a gas chamber 4 for being filled with gas. The flexible accommodating body 21 is provided in the hollow chamber and is communicated with the gas chamber 4.

The flexible accommodating body 21 has an accommodating chamber therein and hydraulic medium is provided inside the accommodating chamber. The hydraulic medium can flow to the gas chamber 4 under pressure.

One end of the adjustable foot 19 is relatively slidably set in the hollow chamber and the flexible accommodating body 21 is in contact with or connected to the adjustable foot 19.

The leveling foot of the washing machine with a function of automatic leveling of the embodiment, according to the hydraulic principle, is provided with the hydraulic medium therein. Under different pressures, the leveling foot is able to automatically perform adaptive adjustment due to the fluidity of the hydraulic medium.

In addition, the leveling foot of the washing machine with the function of automatic leveling of the embodiment holds the hydraulic medium in the enclosed flexible accommodating body 21, and the flexible accommodating body 21 is set inside the the adjustable foot 19. It effectively solves the problem of the leakage of the hydraulic medium and ensures the working stability of the leveling foot.

Therefore, the structure of the leveling foot of the washing machine of the present embodiment is simple, and the cost is low. It is easy to use and has high reliability, and it can remarkably reduce the vibration, reduce noise, and improve the comfort of the experience of the washing machine for users.

Specifically, a valve board 17 is provided inside the hollow chamber of the foot base. The hollow chamber is divided to an upper chamber and a lower chamber by the valve board 17, and the upper chamber is a gas chamber 4 which is applied to be filled with gas. One end of the flexible accommodating body 21 is open and an accommodating chamber is provided therein. The hydraulic medium is provided inside the accommodating chamber. The flexible accommodating body 21 is provided in the lower chamber and the opening of the flexible accommodating body 21 is hermetically connected to the valve board 17. The valve board 17 is provided with a conducting hole through which the hydraulic medium flows to the gas chamber under pressure. One end of the adjustable foot 19 is relatively slidably set in the lower chamber of the hollow chamber.

The hollow chamber of the foot base of the embodiment is divided to chambers which are communicated with each other. One chamber is applied as the gas chamber 4 and the other chamber is provided with the flexible accommodating body 21 therein. And the adjustable foot 19 is relatively slidably set in the lower chamber of the hollow chamber. It enables the flexible accommodating body 21 to set in the enclosed chamber between the adjustable foot 19 and the lower chamber of the hollow chamber. The flexible accommodating body 21 is squeezed when the the adjustable foot 19 is compressed, and the hydraulic medium inside the flexible accommodating body 21 flows under compression to achieve automatic leveling.

Further, the foot base comprises a cylinder block 16 and a sheath 18 which are connected with each other. The valve board 17 is provided between the cylinder block 16 and the sheath 18. Above the valve board 17 is the cylinder block 16 and the gas chamber 4 is inside the cylinder block 16. Below the valve board 17 is the sheath 18, and the flexible accommodating body 21 is provided inside the sheath 18. One end of the adjustable foot 19 is relatively slidably set inside the sheath 18.

In the present embodiment, when the valve board 17, the cylinder block 16 and the sheath 18 are assembled, it is necessary to maintain the sealing property of the assembly to satisfy flow ability of the hydraulic medium in the flexible accommodating body 21. Thus, the cylinder block 16, the valve board 17 and the sheath 18 are fastened together by bolts, and the cylinder block 16, the valve board 17 and the sheath 18 are respectively provided with screw holes 24. An annular recess 1802 is provided on the inner side of the upper opening of the sheath 18, and the opening of the flexible accommodating body 21 is flanged outward to form a sealing strip mechanism 2101. The sealing strip mechanism 2101 is installed inside the annular recess 1802. After the valve board 17 and the sheath 18 are fastened together, the sealing strip mechanism 2101 is press-fitted in the annular recess 1802 to achieve a sealing connection.

Further, a seal ring 22 is provided between the valve board 17 and the cylinder block 16 in the embodiment, enabling a sealed connection between the valve board 17 and the cylinder block 16, to avoid leakage of gas and oil.

An end of the sheath 18 is provided with an inner ring boss 1801 and an end of the adjustable foot 19 is provided with an outer ring boss 1901. The inner ring boss 1801 and the outer ring boss 1901 are engaged with each other. The inner ring boss 1801 cooperates with the outer ring boss 1901 to form a locking mechanism 23, to prevent the adjustable foot 19 from departing from the sheath 18.

Further, the diameter of inner ring boss 1801 is smaller than the diameter of outer ring boss 1901, to perform a locking function to the adjustable foot 19. It prevents the adjustable foot 19 from departing from the sheath 18 accidentally, which results in infinite expansion of the flexible accommodating body 21 to cause the sheath 18 to burst at high pressure or results in that the flexible accommodating body 21 is in direct contact with the ground to cause the burst due to sharp objects.

The flexible accommodating body 21 of the present embodiment is a bellows mechanism made of a flexible material. The upper end of the bellows mechanism is open, the lower end is closed, and the closed end is in contact with or connected to the adjustable foot. The flexible accommodating body 21 is made of a flexible material, which is with better deformation, to accommodate with the telescopic and extrusion of the adjustable foot 19. The bellows mechanism allows compression under large pressure and recovery under small pressure.

The valve board 17 of the embodiment is provided with an orifice 5 and/or a valve opening 6, and it enables that the hydraulic medium and the gas can slowly pass through the orifice 5. A valve block 25 is provided above the valve opening 6, enabling the valve opening 6 to be sealed to throttle when the leveling foot is subjected to great force suddenly or is under great pressure, to prevent the failure of the foot caused by excessive pressure of the hydraulic medium.

The cylinder block 16 of the embodiment is provided with a screw column 20 for connecting the bottom of the washing machine. The screw column 20 is able to be screwed directly into screw holes of the bottom board of the washing machine. Of course, it is possible to conceive that the screw column 20 can be removed and some through-holes are provided, and then the leveling feet are fixedly connected to the bottom board 901 by bolts or screws.

The adjustable foot 19 of the embodiment is provided with a hollow chamber. The adjustable foot 19 is installed on the sheath 18 and is wrapped with a flexible accommodating body 21. Under the pressure which acts on the flexible accommodating body 21, the hydraulic medium flows to the gas chamber 4, and the flexible accommodating body 21 drives the adjustable foot 19 to expand and contract, to achieve the automatic leveling.

The leveling foot of the washing machine of the embodiment uses the gas as the elastic medium and the liquid medium as the force transmission medium. It not only has a good ability of cushioning, but also has a damping effect. At the same time, it can also adjust the height of the foot itself according to the size of the pressure it withstands.

When the load of the leveling foot is large, the adjustable foot 19 moves upward to make the volume of the hollow chamber of the flexible accommodating body 21 which is full of the hydraulic medium reduce. The hydraulic medium is forced to flow into the gas chamber 4 through the orifice 5 or the valve opening 6. The volume of the gas chamber 4 is reduced, the pressure of the gas is increased, and the height of the entire foot is reduced. When the external load is equal to the pressure of the gas and the hydraulic medium, the adjustable foot 19 stops moving up. Thus, the distance that the adjustable foot 19 moves upward into the sheath 18 is related to the size of the load subjected. At this time, the relative position of the adjustable foot 19 and the bottom board 901 of the washing machine is not changed any longer and the automatic adjustment of the leveling foot of the washing machine is completed.

Figure 17:
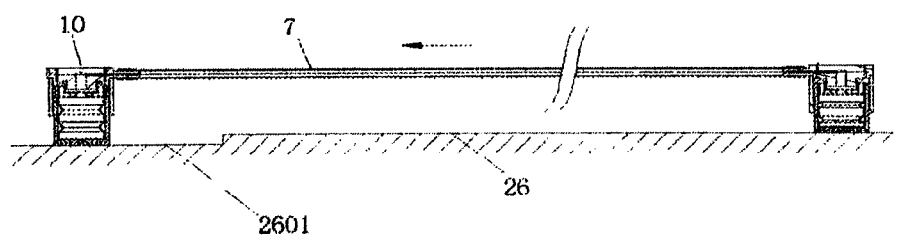
FIG. 17 is a schematic diagram of a working state of the leveling foot of a washing machine of the present disclosure.

As shown in FIG. 17, it specifically explains the principle of leveling. After the washing machine is installed, it results in different levels of different feet height because the ground 26 is uneven, and the position of the foot located in a ground pit 2601 is low. It is possible to know that the foot in the high position bears the weight of the washing machine at first and bears greater gravity. The foot in the low position on the state of virtual legs may bear smaller gravity. The adjustable foot of the foot in the high position moves upward under greater pressure. The height of the entire foot gets small to make the volume of the hollow chamber of the flexible accommodating body 21 to be compressed and reduced, and forces the hydraulic medium to flow into the orifice or the valve opening and flow into the foot which is in the lower position through the high-pressure oil pipe group. So the hydraulic medium of the flexible accommodating body of the foot in the lower position gets more and more and the flexible accommodating body expands to drive the adjustable foot to extend.

When hydraulic pressures of the leveling foot in the higher position and the leveling foot in the lower position are equal, the hydraulic medium no longer flows through the high-pressure oil pipe group and the relative positions of the adjustable foot and the bottom board of the washing machine no longer change, and the automatic adjustment of the leveling feet of the washing machine is completed.

In the washing process and the dewatering process of the washing machine, because the hydraulic medium still flows slowly to self-level, the vibration noise of the washing machine is greatly reduced.

A washing machine which has the above-mentioned leveling feet of a washing machine with a function of automatic leveling is provided at the same time in the embodiment. The washing machine comprises a housing 9, and the bottom of the housing 9 is provided with a plurality of the leveling feet mentioned. The hydraulic medium provided inside the leveling feet of the washing machine can flow inside the leveling feet and/or between the leveling feet to achieve the leveling.

The factory setting of the washing machine of the embodiment is preferably that heights of four leveling feet of the washing machine are the same. The washing machine is randomly placed on an uneven ground and the four leveling feet bear different pressures according to the uneven states and the lengths of which adjustable feet are pressed into sheaths are different, and then the automatic leveling of the washing machine is realized.

Further illustrations which are necessary for the above embodiments are:

1. Every two of the feet of the embodiments of the present disclosure are communicated. It can be three or more and the number N preferably two. It costs the lowest and can achieve better results.

Four end openings of the communicating device 15 are applied to be respectively connected with four leveling feet. It is reasonable that three, five, six or N end openings of the communicating device 15 are applied, and the end openings are respectively connected with three, five, six or N feet. The above-described embodiments apply four leveling feet which is the most suitable merely in the situation of being capable of achieving the described functions, to control the cost to the minimum.

2. The embodiments of the present disclosure take a drum washing machine as an example to describe the principle and the method of the automatic leveling of the drum washing machine. What is easy to associate with is that the present disclosure can be applied to a pulsator washing machine.

3. The embodiments of the present disclosure take a washing machine as an example to describe the principle and the method of the automatic leveling of the washing machine. What is easy to associate with is that the present disclosure can be applied to refrigerators, freezers, dishwashers, air conditioning indoor units, water dispenser, microwave ovens, roasters, floor air conditioning fans and air purifiers and other household appliances.

The foregoing is merely illustrative of the preferred embodiments of the present invention and is not intended to be limiting of the present invention. While the invention has been disclosed by way of example with reference to the preferred embodiments, it is not intended to be limiting of the invention. Any person skilled in the art will, without departing from the scope of the technical solution of the present invention, may make use of the technical contents of the above-mentioned tips to make some alterations or modifications to equivalent embodiments, but without departing from the scope of the technical solution of the present invention. Any and all modifications, equivalents, and modifications of the foregoing embodiments are within the scope of the present invention without departing from the spirit of the technical solution of the present invention in accordance with the technical details of the present invention.

The invention claimed is:

1. A leveling device for a household appliance, comprising:
   at least two leveling feet provided at a bottom of the household appliance, each of the leveling feet including a plunger mechanism,
      a foot base including a gas chamber, and an oil chamber, the gas chamber and the oil chamber are isolated by a valve board inside the foot base, a hydraulic medium is provided in the oil chamber,
   wherein one end of the plunger mechanism has a plug body set relatively slidably in the oil chamber and keeps the oil chamber sealed, the other end of the plunger mechanism is provided with a supporting body;
   the valve board has an orifice which enables the hydraulic medium to pass through from the oil chamber to the gas chamber or from the gas chamber to the oil chamber and
   the oil chamber inside each leveling foot and hollow chambers between the at least two leveling feet are configured to circulate hydraulic medium under action of pressure for expanding and contracting the plunger mechanism, to execute automatic leveling.

2. The leveling device for a household appliance according to claim 1, wherein the household appliance comprises a housing and a bottom board of the housing is provided with the at least two leveling feet,
   each leveling foot is filled with the hydraulic medium and gas, the hydraulic medium and gas inside each leveling foot interact with each other for expanding and the contracting the plunger mechanism under different pressures, to level automatically.

3. A household appliance, wherein the household appliance is provided with the leveling device according to claim 2.

4. The leveling device for a household appliance according to claim 1, wherein the household appliance comprises a housing and at least four leveling feet evenly provided at four corners of a bottom board of the housing or along a circumferential direction of the bottom board of the housing, at least two leveling feet of the at least four leveling feet are communicated with each other;
   each leveling foot is filled with the hydraulic medium and gas within, and within a first range of pressure, the hydraulic medium and the gas within the at least two leveling feet interact with each other for expanding and a contracting of the plunger mechanism, to level automatically,
   and within a second range of pressure, the hydraulic medium and the gas within the at least two leveling feet interact with each other for expanding and the contracting the plunger mechanism, to level automatically.

5. The leveling device for a household appliance according to claim 4, wherein each leveling foot comprises at least one oil pipe, and the gas chamber and the oil chamber are communicated through the orifice and a valve opening,
   and the oil pipe is respectively communicated with the gas chambers of two leveling feet.

6. The leveling device for a household appliance according to claim 4, wherein each leveling foot comprises at least one oil pipe,
   a volume of the hydraulic medium is less than a maximum volume of the oil chamber, and the orifice and a valve opening are provided respectively on a top of the oil chamber, and the oil pipe is respectively communicated with the orifices and the valve openings of the at least two leveling feet.

7. The leveling device for a household appliance according to claim 4, wherein the four leveling feet are provided and divided into two sets of leveling feet which are communicated with each other,
   two adjacent leveling feet or two diagonally set leveling feet are respectively communicated with each other.

8. A household appliance, wherein the household appliance is provided with the leveling device according to claim 4.

9. The leveling device for a household appliance according to claim 1, wherein the household appliance comprises a housing and at least four leveling feet are provided evenly at four corners of a bottom board of the housing or along a circumferential direction of the bottom board of the housing, each leveling foot is filled with the hydraulic medium and gas,
   within a first range of pressure, the hydraulic medium and the gas inside said each leveling foot interact with each other for expanding and contracting the plunger mechanism, to level automatically,
   and within a second range of pressure, the hydraulic medium and the gas inside the leveling feet communicated interact with each other for expanding and contracting the plunger mechanism, to level automatically.

10. The leveling device for a household appliance according to claim 9, wherein the oil chamber of each leveling foot communicates with at least one oil pipe, the oil pipe of each leveling foot respectively communicates with a communicating device to make all the leveling feet communicate with each other.

11. A household appliance, wherein the household appliance is provided with the leveling device according to claim 1.

12. The leveling device for a household appliance according to claim 1, wherein the oil chamber is provided with a flexible accommodating body therein, and the flexible accommodating body is provided with the hydraulic medium, the gas chamber and the flexible accommodating body are communicated through the orifice and a valve opening;

the flexible accommodating body is squeezed when the plunger mechanism is compressed, and the hydraulic medium inside the flexible accommodating body flows under compression.

* * * * *